A. W. PHELPS.
FRUIT AND MELON GRADER.
APPLICATION FILED NOV. 14, 1917.
1,259,905.
Patented Mar. 19, 1918.
3 SHEETS—SHEET 1.
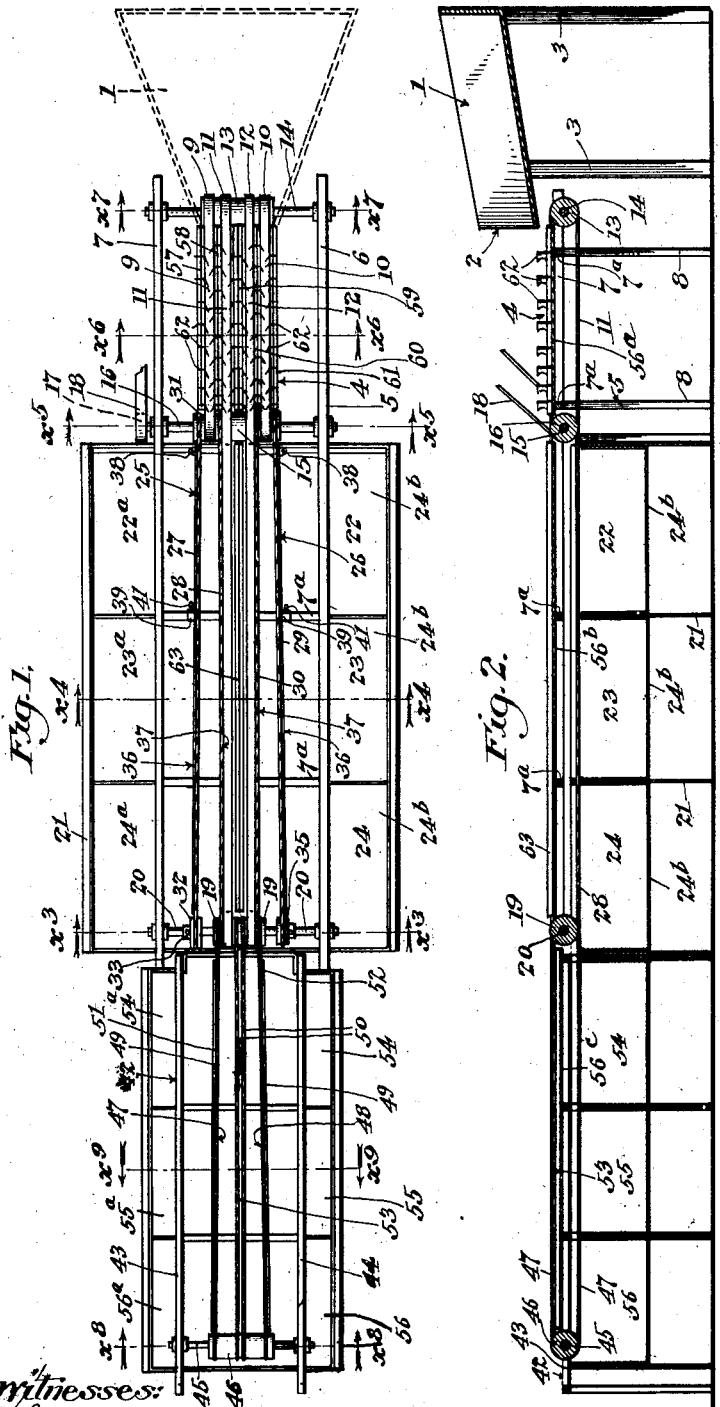

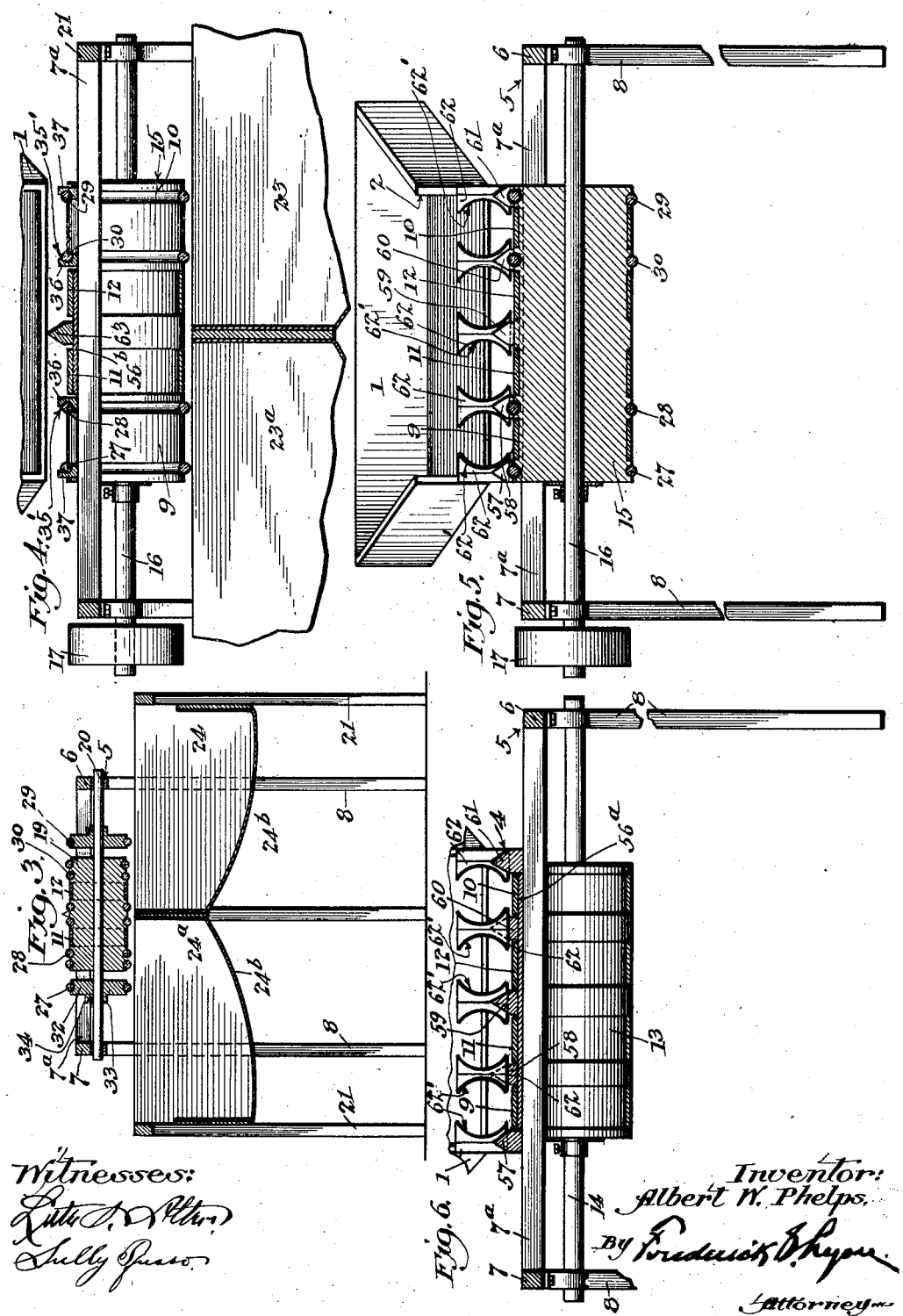

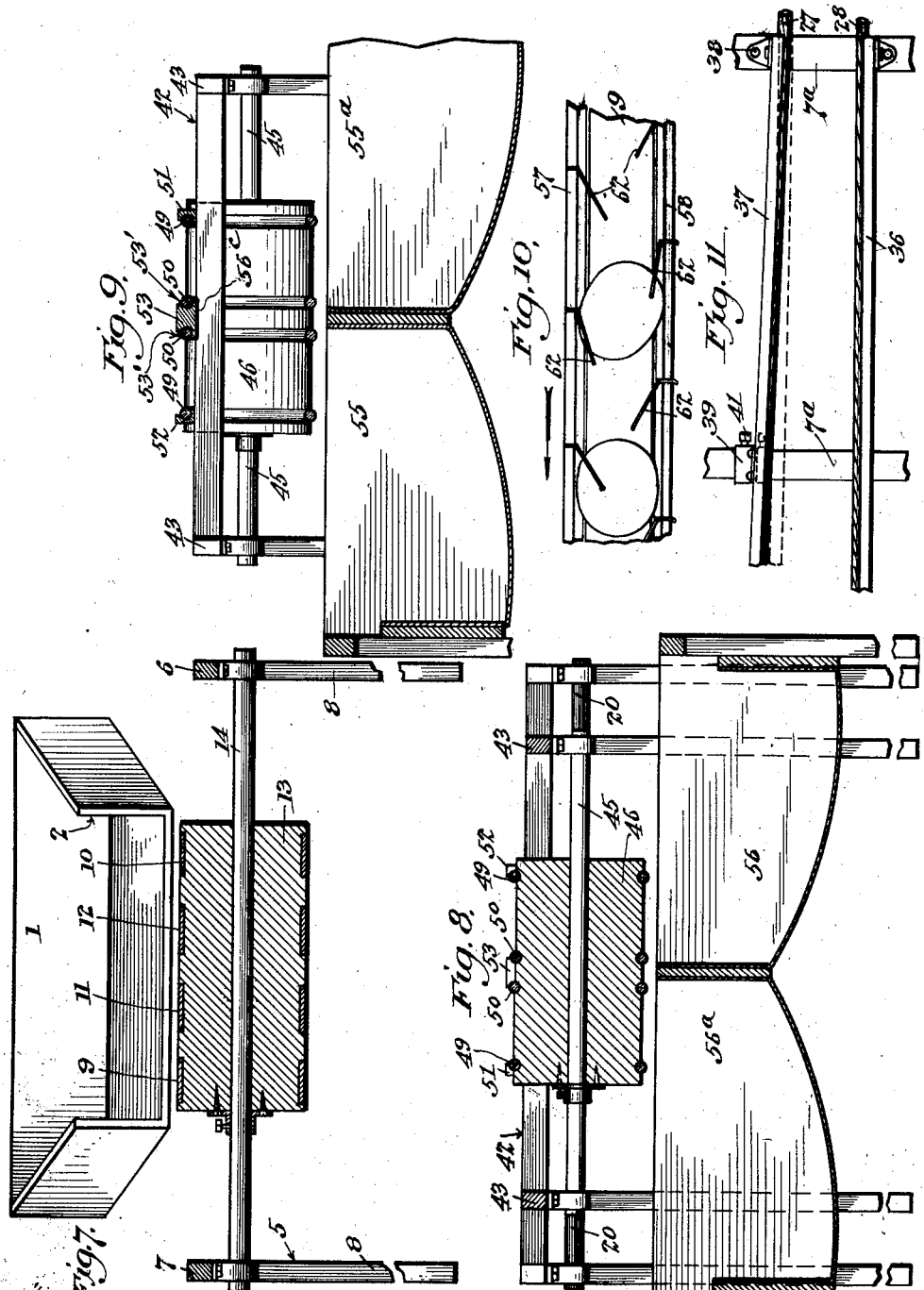

UNITED STATES PATENT OFFICE.

ALBERT W. PHELPS, OF FRESNO, CALIFORNIA.

FRUIT AND MELON GRADER.

1,259,905.

Specification of Letters Patent.  Patented Mar. 19, 1918.

Application filed November 14, 1917. Serial No. 202,039.

*To all whom it may concern:*

Be it known that I, ALBERT W. PHELPS, a citizen of the United States, residing at Fresno, in the county of Fresno and State of California, have invented a new and useful Fruit and Melon Grader, of which the following is a specification.

This invention relates to graders for fruit, melons and also vegetables.

An object of this invention is to provide a simply constructed inexpensive grader which will quickly and without injury grade or separate fruit, melons or vegetables according to size and deposit the different grades or sizes into bins or receptacles.

Another object is to provide adjustable grading means which will permit a variance in the grading action so that melons, fruit and vegetables of different sizes may be separated as desired.

Another object is to provide a feeding conveyer for carrying fruit, melons or vegetables from the hopper to the grading members and which causes each piece of the fruit or the melon or vegetable in case of its being oblong or of a similar irregular shape to be deposited upon the grading members in the same position, for example, when oblong melons such as cantaloups are graded they will all be deposited upon the grading members in a lengthwise position.

Other objects and advantages will appear in the course of the following description.

The accompanying drawings illustrate the invention:

Figure 1 is a top plan view of a grader, constructed in accordance with the invention.

Fig. 2 is a longitudinal sectional view of the grader.

Fig. 3 is a cross sectional view taken on line $x^3$—$x^3$ of Fig. 1.

Fig. 4 is a cross sectional view taken on line $x^4$—$x^4$ of Fig. 1.

Fig. 5 is a cross sectional view taken on line $x^5$—$x^5$ of Fig. 1.

Fig. 6 is a cross sectional view taken on line $x^6$—$x^6$ of Fig. 1.

Fig. 7 is a cross sectional view taken on line $x^7$—$x^7$ of Fig. 1.

Fig. 8 is a cross sectional view taken on line $x^8$—$x^8$ of Fig. 1.

Fig. 9 is a cross sectional view taken on line $x^9$—$x^9$ of Fig. 1.

Fig. 10 is a fragmentary plan view of the feeder conveyer.

Fig. 11 is a fragmentary plan view of one of the adjustable grading members.

Referring to the drawings, 1 designates an inclined hopper or chute having a restricted discharge mouth 2 and supported upon legs or standards 3. This hopper or chute is adapted to feed fruit, melons or vegetables to be graded onto a feeder conveyer designated 4 as an entirety. It is to be understood that the term "fruit" to be used hereinafter shall apply to vegetables and melons and the like, the adoption of such term for further use being for the sake of clearness. The conveyer is mounted upon a suitable supporting frame 5 which constitutes parallel side bars 6 and 7 and cross bars $7^a$ supported in horizontal position by legs or standards 8. The conveyer 4 comprises a number of endless belts 9, 10, 11 and 12 all of which are rove around a roller 13 which is fixed to a shaft 14 journaled between the bars 6 and 7 at the end of the frame work which is located adjacent to the hopper 1. There is provided a similar roller 15 mounted upon a shaft 16 having a drive pulley 17 which is driven by a belt 18 being operated from a suitable source or power not shown. The belts 9 and 10 are mounted upon the rollers 15; whereas the belts 11 and 12 extend over and upon the top of the roller 15 to the opposite end of the frame work 5 where they are rove around a roller 19 mounted upon a shaft 20 which is journaled between the bars 6 and 7 of the frame.

Positioned between the rollers 15 and 19 of the frame 5 is an additional frame structure 21 supporting bins or receptacles 22, 23 and 24 which are in line with one another and located on one side of the feeder conveyer and bins $22^a$, $23^a$ and $24^a$ located in line with one another on the opposite side of the feeder conveyer. These bins or receptacles are adapted to receive the different grades of fruit or melons and their bottoms 24$^b$ are preferably constructed of canvas or some other soft material which will not cause the fruit to become bruised or injured when dropped thereon.

There is provided grading means on opposite sides of the belts 11 and 12 and which extends over the bins 22, 23 and 24. This means comprises two grading members 25 and 26. The member 25 comprises a pair of endless ropes or cables 27 and 28 and the member 26 consists of a similar pair of ropes or cables 29 and 30. The ropes or cables 27 and 28 are mounted within annular grooves 31 formed in the roller 15 between one end of the roller and the belt 11, the belt 9 being located between the cables 27 and 28. The outermost cable 27 is mounted upon an adjustable pulley 32 carried on the shaft 20, said pulley having a sleeve 33 surrounding the shaft and being provided with a set screw 34 extending through the sleeve and adapted to engage the shaft to hold the pulley in adjusted position. The other of the cables 28 is mounted upon the roller 19. It will be seen that the cable 27 diverges from the cable 28 toward the roller 19. The cables 28 and 30 are mounted upon the roller 15 on opposite sides of the belt 10 and extend toward the roller 19, the outermost of the cables 29 being mounted upon an adjustable pulley 35 on the shaft 20 and the other cable 30 being mounted upon the roller 19. These cables also diverge from the roller 15 toward the roller 19.

Mounted upon the frame work 5 are guide strips 36 and 37 which are grooved as at 35' along certain longitudinal faces to receive the cables 27, 28, 29 and 30. The strips 36 are stationary and located on opposite sides of the belts 11 and 12; whereas the strips 37 are pivoted as at 38 to the frame work 5 and at points intermediate their ends carry sleeves or collars 39 which are slidably mounted upon one of the bars 7$^a$ of the frame work 5. A set screw 41 is provided to hold the sleeve and strip in adjusted position. The strips 37 are adjustable so that they may be diverged relative to the strips 36 in order to lie parallel with the divergent cables. These strips 36 and 37 serve to prevent the cables from spreading apart when the weight of melons or pieces of fruit is placed thereon and in this way provide for accurate grading.

The grading member 26 is adapted to separate a different grade of fruit or melon relative to the grader 25 and the grader 26 causes the graded fruit or melons to be deposited into the receptacles 22, 23 and 24; whereas the grader 25 causes the melons or fruit to be deposited in the receptacles 22$^a$, 23$^a$ and 24$^a$.

A suitable frame work 42 including spaced parallel bars 43 and 44 is mounted in front of the frame work 5 and adjacent to its outer end supports a horizontal shaft 45 transversely thereof. A roller 46 is mounted upon the shaft and grading members 47 and 48 are carried upon the frame work 42. These grading members 47 and 48 constitute endless cables 49 and 50 arranged in pairs as are the cables 27, 28, 29 and 30, both pairs of cables being rove around the roller 46. The innermost cables of each grading member lie parallel in slightly spaced relation to one another and are rove around the roller 19; whereas the outermost cables of each grading member are rove around the rollers 19 and 46 and are diverged relative to the innermost cables from the roller 19 toward the roller 46.

There are provided fixed guide strips 51 and 52 for the cables 49 and a similar guide strip 53 is mounted between the cables 50, these guide strips being similar in construction to the guide strips 36 and 37, the guide strip 53 being grooved on opposite sides as at 53' to receive the cables 50.

Mounted beneath the grader members 49 and 50 are a number of bins or receptacles, the ones 54, 55 and 56 being adapted to receive fruit or melons from the grader 47; whereas the bins 54$^a$, 55$^a$ and 56$^a$ are adapted to receive the fruit or melons from the grader member 48, said bins being in line with one another as are the bins for the grader members 25 and 26.

There is provided a means for preventing the upper runs of the belts 9, 10, 11 and 12 from sagging under the weight of fruit which comprises a flat board or plate 56$^a$ which is placed beneath such upper runs upon the frame work 5, the ends of the plate extending over the bars 7$^a$ of the frame 5. A similar plate 56$^b$ extends under the portions of the upper runs of the belts 11 and 12 that lie between the rollers 15 and 19, such plate 56$^b$ being mounted upon the cross bars 7$^a$ of the frame and a flat strip 56$^c$ is mounted upon the frame structure 42 and extends under the cables 53.

There are provided means for turning pieces of fruit or melons placed upon the feeder conveyer so that when the fruit pieces or melons are deposited upon the grader members 25 and 26 they will all assume the same position and such means constitutes a strip or bar 57 extending along the outer edge of the belt 9 between the rollers 13 and 15, a similar strip 58 mounted between the opposed edges of the belts 9 and 11, a strip 59 mounted between the belts 11 and 12, a strip 60 mounted between the belts 10 and 12 and a strip 61 corresponding to the strip 57 mounted along the outer edge of the belt 10. Each of these strips is provided with a series of transversely mounted flexible deflectors 62 which are mounted in staggered relation and preferably constructed of rubber, fiber or some other resilient and yielding material. These deflectors extend diagonally over the belts 9, 10, 11 and 12 and engage the fruit placed upon the belt so as to turn the fruit in order that when the fruit is deposited upon the grader members all of the pieces of fruit will be placed upon the grader member. The deflectors 62 are substantially V-shaped, their fruit engaging area being disposed diagonally relative to the belts. The vertical edges of the deflectors are scalloped or curved as at 62' so that there is provided an approximately circular opening or space between the deflectors to permit fruit to pass between the deflectors.

To permit the fruit carried along the belts 11 and 12 which extend to the grader members 47 and 48 from bunching, a guide strip 63 is placed along the frame work 5 between the belts 11 and 12. This guide strip is provided with upwardly beveled inclined faces on the opposite sides and may have deflectors 64 such as the deflectors 62 mounted on opposite sides thereof and extending over the belts so as to cause the fruit or melons to be turned and brought into the proper position for being deposited upon the grader members 47 and 48. It will be seen that the forward ends of the belts 11 and 12 are located between the cables of the grader members 47 and 48 so that the fruit will be deposited upon the cables.

In the operation of the grader, fruit is deposited in the inclined hopper 1 and will by force of gravity roll upon the feeder conveyer 4. The feeder conveyer 4 and grading members are driven from a suitable source of power, not shown, to which the belt 18 extends. An operator or attendant stands to one side of the feeder conveyer 4 and as the fruit rolls upon the conveyer selects or classifies fruit according to its appearance and places the classified or selected fruit upon the different belts 9, 10, 11 and 12. For example, assuming that cantaloups are being graded by the device, the operator selects those cantaloups regardless of size which have a certain color or appearance and places them upon the belt 9 and other cantaloups having different appearance upon the other belts 10, 11 and 12. It is noted that the belt 9 feeds fruit to the grader member 25 and the fruit thus fed is graded according to size and allowed to drop into the bins 22$^a$, 23$^a$ and 24$^a$. If the fruit is oblong it is desirous of having it deposited or placed upon the cables 27 and 28 of the grader member 25 with its longitudinal axis paralled to the cables so that the oblong pieces will be graded according to their width and a uniform grading provided. As the fruit placed upon the belt 9 is deposited upon the cables 27 and 28, it is carried forward and the small pieces fall between the cables into the bins or receptacles 23$^a$ and the still larger pieces fall through the cables into the bin 24$^a$, or if too large pass on beyond the ends of the cables 27 and 28 into the adjacent bin 54$^a$. Some of the fruit selected as differing in appearance from the fruit placed upon the belt 9 is placed upon the belts 10 and 11 and is thus carried forward to the grading members 47 and 48. The guide strip 63 prevents the fruit from bunching and causes it to be conveyed in single file to said grading members 47 and 48. The deflector members 64 on the guide strip causes the fruit to be deposited lengthwise upon the grader members 47 and 48 and as said grader members carry the fruit in lengthwise position forwardly the fruit will according to size drop between the cables of said grading members and into the bins therefor so that the fruit carried on the two belts 10 and 11 is graded into six different sizes, the six bins 54, 55, 56, 54$^a$, 55$^a$ and 56$^a$ providing for the grading in all, of six sizes of two classes, differing as to appearance. The fruit placed by the operator or attendant upon the cables 29 and 30 of the grading member 26 is allowed to drop into the bins 22, 23 and 24. It will be seen that it is possible to grade the fruit into four classes differing as to appearance, but if desired additional belts may be added to the feeder conveyer and additional grading members may be employed. As a whole, the machine as illustrated, provides for four grades of fruit as to appearance and twelve grades according to size.

Since the feeder conveyer 4 and the grading members are located in the same plane and are horizontal, the fruit is not caused to drop or subjected to sudden turning or jostling such as would tend to bruise or have a detrimental effect upon fruit, and the fact that the grading members and feeder conveyer are located in the same plane and the fruit is caused to drop only once, that is, from the grading members into the bins, insures against bruising or injuring the fruit during the grading operation.

When it is desired to regulate the size of the fruit to be graded, the set screws 41 are loosened and the strips 37 are swung on their pivots so as to allow for the cables 27 and 29 to be diverged as desired relative to the cables 28 and 30, and upon tightening the set screws the strips are held in position. The set screws 34 on the adjustable pulleys 32 and 35 are then loosened and the pulleys shifted to the desired extent causing the cables 27 and 29 to be correspondingly shifted and to assume the desired position relative to the strips therefor.

With reference to the foregoing description and accompanying drawings, it will be observed that I have provided a grading device with which fruit both round, oblong and other irregular shapes may be graded accurately without injury thereto and expeditiously.

I claim:

1. In a grader, a grading member, a feeder conveyer mounted in the same plane as the grading member, and means coöperating with the feeder conveyer to cause oblong fruit to be deposited upon the grading member in a certain position.

2. In a grader, a grading member comprising divergent endless cables, means to operate the cables, receptacles to receive the graded fruit mounted beneath the cables, a feeder conveyer for depositing fruit upon the cables, and means to cause oblong fruit to be deposited in a certain position upon the cables.

3. In a grader, grading members comprising divergent endless cables, means to rotate the cables, endless conveyers mounted in the same plane as the cables and located at certain ends between the cables to deposit fruit thereon, receptacles to receive fruit mounted beneath the cables, and means for causing oblong fruit to be deposited in a cetrain position upon the cables.

4. In a grader, a frame, rollers journaled in the frame, endless cables mounted upon the rollers and being diverged relative to one another receptacles beneath the cables, another roller, conveyer belts mounted upon the last named and one of the first named rollers and located between the divergent cables to convey fruit thereto.

5. In a grader, a grading member comprising endless cables spaced apart and adapted to support fruit thereon, one of said cables being diverged relative to the other cables to allow fruit to drop between the cables as it is conveyed thereby, and a feeder conveyer for feeding fruit to the cables mounted in the same plane as the cables.

6. In a grader, a grading member comprising endless cables spaced apart and adapted to support fruit thereon, one of said cables being diverged relative to the other cable to allow fruit to drop between the cables as it is conveyed thereby, a feeder conveyer for feeding fruit to the cables mounted in the same plane as the cables, and means to adjust the divergent cable so as to increase or decrease the degree of its divergence relative to the other cable.

7. A grader comprising a frame, a pair of rollers journaled in the frame, conveyer belts mounted upon the rollers, another roller located in spaced relation to one of the rollers of the pair thereof, all of said rollers being mounted in the same plane, a shaft for the last named roller, pulleys mounted on the shaft at opposite ends of the last named roller, endless cables rove around one of the first named rollers and the last named roller, other endless cables being rove around one of the first named rollers and the pulleys and diverged relative to the first named cables.

8. A grader comprising a frame, a pair of rollers journaled in the frame, conveyer belts mounted upon the rollers, another roller located in spaced relation to one of the rollers of the pair thereof, all of said rollers being mounted in the same plane, a shaft for the last named roller, pulleys mounted on the shaft at opposite ends of the last named roller, endless cables rove around one of the first named rollers and the last named roller, other endless cables being rove around one of the first named rollers and the pulleys and diverged relative to the first named cables, said belts being located between the first and last named cables and adapted to convey fruit to the cables.

9. A grader comprising a frame, a pair of rollers journaled in the frame, conveyer belts mounted upon the rollers, another roller located in spaced relation to one of the rollers of the pair thereof, all of said rollers being mounted in the same plane, a shaft for the last named roller, pulleys mounted on the shaft at opposite ends of the last named roller, endless cables rove around one of the first named rollers and the last named roller, other endless cables being rove around one of the first named rollers and the pulleys and diverged relative to the first named cables, and means to cause oblong fruit to be deposited in a certain position upon the cables.

10. A grader comprising a frame, a pair of rollers journaled in the frame, conveyer belts mounted upon the rollers, another roller located in spaced relation to one of the rollers of the pair thereof, all of said rollers being mounted in the same plane, a shaft for the last named roller, pulleys mounted on the shaft at opposite ends of the last named roller, endless cables rove around one of the first named rollers and the last named roller, other endless cables being rove around one of the first named rollers and the pulleys and diverged relative to the first named cables, said pulleys being shiftable upon the shaft.

11. A fruit grader comprising a frame, a grading member mounted upon the frame, endless conveyer belts for conveying fruit to the grading member and flexible deflecting members extending over the belts to engage and cause oblong fruit to be deposited upon the grading member in a certain position.

12. In a fruit grader, a frame, a grading member carried by the frame and comprising spaced divergent endless cables, means to operate the cables, conveyer belts mounted upon the frame and being located in the same plane as and between the cables at one end, means to operate the belts, and receptacles to receive different grades of fruit located beneath the cables.

13. In a fruit grader, a frame, a grading member carried by the frame and comprising spaced divergent cables, means to operate the cables, conveyer belts mounted upon the frame and being located in the same plane as and between the cables at one end, means to operate the belts, receptacles to receive different grades of fruit located beneath the cables, guide strips extending along and carried by the frame and engaged by the cables, said strips being grooved to receive the cables.

14. In a fruit grader, a frame, a grading member carried by the frame and comprising spaced divergent endless cables, means to operate the cables, conveyer belts mounted upon the frame and being located in the same plane as and between the cables at one end, means to operate the belts, receptacles to receive different grades of fruit located beneath the cables, one of said cables being shiftable relative to the other, and a shiftable pulley for said shiftable cable.

15. In a fruit grader, a frame, a grading member carried by the frame and comprising spaced divergent endless cables, means to operate the cables, conveyer belts mounted upon the frame and being located in the same plane as and between the cables at one end, means to operate the belts, receptacles to receive different grades of fruit located beneath the cables, one of said cables being shiftable relative to the other, a shiftable pulley for said shiftable cable, and guide strips carried by the frame and engaged by the cables, one of said guide strips being shiftable and engaging the shiftable cable.

16. In a fruit grader, a frame, a grading member carried by the frame and comprising spaced divergent endless cables, means to operate the cables, conveyer belts mounted upon the frame and being located in the same plane as and between the cables at one end, means to operate the belts, receptacles to receive different grades of fruit located beneath the cables, one of said cables being shiftable relative to the other, a shiftable pulley for said shiftable cable, and guide strips carried by the frame and engaged by the cables, one of said guide strips being shiftable and engaging the shiftable cable, and flexible deflecting members carried by the frame and extending over the cables to engage oblong fruit and cause it to be deposited in a certain position upon the cable.

17. A fruit grader comprising a frame, a shaft journaled in the frame, means for rotating the shaft, a roller mounted upon the shaft, another roller mounted within the frame, endless conveyer belts mounted upon the roller, another shaft mounted upon the frame, a roller mounted upon said shaft, conveyer belts extending from the second named roller over and beneath the first named roller and being rove around the last named roller, a grading member mounted in front of the last named roller and being in the same plane as the last named conveyer belts to receive fruit therefrom, endless cables mounted upon the first and last named rollers, shiftable pulleys mounted upon the last named shaft, endless cables rove around the shiftable pulleys and first named roller and being diverged relative to the first named cables from the first named toward the last named roller, said first named belts being located in the same plane as and extending between the cables.

18. A fruit grader comprising a frame, a shaft journaled in the frame, means for rotating the shaft, a roller mounted upon the shaft, another roller mounted within the frame, endless conveyer belts mounted upon the roller, another shaft mounted upon the frame, a roller mounted upon the shaft, conveyer belts extending from the second named roller over and beneath the first named roller and being rove around the last named roller, a grading member mounted in front of the last named roller and being in the same plane as the last named conveyer belts to receive fruit therefrom, endless cables mounted upon the first and last named rollers, shiftable pulleys mounted upon the last named shaft, endless cables rove around the shiftable pulleys and first named roller and being diverged relative to the first named cables from the first named toward the last named roller, said first named belts being located in the same plane as and extending between the cables, and guide strips mounted along the frame and engaging the outer faces of the cables.

19. A grader comprising rotatively mounted endless cables spaced from each other, the spacing being gradually increased in one direction, and an endless belt rotatively mounted and having the upper run thereof extending alongside of a portion of the upper run of the cables so that objects will readily pass in a single plane from the belt to the cables.

20. A grader comprising rotatively mounted endless cables spaced from each other, the spacing being gradually increased in one direction, and means to deposit oblong objects on the cables with the long diameter of the objects lengthwise of the cables.

21. A grader comprising rotatively mounted endless cables spaced from each other, the spacing being gradually increased in one direction, an endless belt rotatively mounted and having the upper run thereof extending alongside of a portion of the upper run of the cables so that objects will readily pass in a single plane from the belt to the cables, and means to turn the objects on the belt with the long diameter thereof lengthwise of the belt.

Signed at Fresno, California, this 8th day of November, 1917.

ALBERT W. PHELPS.

Witnesses:
A. J. DEWAR,
A. W. WATKINS.